(12) United States Patent
Jensen (10) Patent No.: US 7,234,153 B2
(45) Date of Patent: Jun. 19, 2007

(54) VIBRATION DAMPER FOR DAMPENING VIBRATIONS AT LOW FREQUENCIES

(75) Inventor: Erik Jensen, Aarhus C (DK)

(73) Assignee: ISIC A/S, Brabrand (DK)

( * ) Notice: Subject to any disclaimer, the term of this patent is extended or adjusted under 35 U.S.C. 154(b) by 0 days.

(21) Appl. No.: 10/486,387

(22) PCT Filed: Aug. 8, 2002

(86) PCT No.: PCT/DK02/00527

§ 371 (c)(1),
(2), (4) Date: Mar. 12, 2004

(87) PCT Pub. No.: WO03/019035

PCT Pub. Date: Mar. 6, 2003

(65) Prior Publication Data

US 2004/0196588 A1    Oct. 7, 2004

(30) Foreign Application Priority Data

Aug. 8, 2001    (DK) ............................... 2001 01197

(51) Int. Cl.
*G11B 33/08*    (2006.01)
*F16M 13/00*    (2006.01)

(52) U.S. Cl. ...................... 720/651; 248/570
(58) Field of Classification Search ............... 720/651; 248/610, 638, 619, 570; 361/683, 679, 638; 360/131, 132
See application file for complete search history.

(56) References Cited

U.S. PATENT DOCUMENTS

| | | | | |
|---|---|---|---|---|
| 2,493,788 A | * | 1/1950 | Turlay | 102/416 |
| 3,023,993 A | * | 3/1962 | Kerley, Jr. | 248/570 |
| 3,031,163 A | * | 4/1962 | Kerley, Jr. | 248/570 |
| 3,204,911 A | * | 9/1965 | Lawrence et al. | 248/611 |
| 3,204,913 A | * | 9/1965 | Lawrence et al. | 248/570 |
| 3,450,379 A | * | 6/1969 | Nolan | 248/636 |
| 3,476,851 A | * | 11/1969 | Camossi | 264/229 |
| 3,596,865 A | * | 8/1971 | Camossi | 248/318 |
| 4,190,227 A | * | 2/1980 | Belfield et al. | 248/636 |
| 4,893,210 A | * | 1/1990 | Mintzlaff | 360/97.01 |
| 4,978,320 A | * | 12/1990 | Chaplin et al. | 440/52 |
| 5,169,110 A | * | 12/1992 | Snaith et al. | 248/570 |

(Continued)

FOREIGN PATENT DOCUMENTS

EP    0 583946    2/1994

(Continued)

*Primary Examiner*—Tan Dinh
*Assistant Examiner*—Christopher R. Magee
(74) *Attorney, Agent, or Firm*—James Creighton Wray (57) ABSTRACT

Electronics are fitted in vehicles, such as boats, ships, trains, buses, lorries, normal cars etc. The electronic items are exposed to jolts and other non-uniform actions. Particularly with regard to jolts, electronic items or apparatuses in which there are also mechanical components are particularly exposed. This is particularly the case with CD players, CD-ROM players, hard disks and similar apparatuses, which besides very sensitive electronics also have very sensitive mechanics. To operate these installations optimally, dampening vibration transmission from the vehicle/ship/train/bus/car to the electro-mechanical component is achieved with a vibration damper having two springs arranged in two mutually perpendicular planes. One plane is parallel with the base. A first spring is fastened to the base. A second spring is fastened to the vibration sensitive item. The two springs are mutually connected.

12 Claims, 6 Drawing Sheets

U.S. PATENT DOCUMENTS

| | | | | |
|---|---|---|---|---|
| 5,374,012 | A * | 12/1994 | Marchand et al. | 244/118.1 |
| 5,499,790 | A * | 3/1996 | Hay | 248/570 |
| 5,663,943 | A * | 9/1997 | Yanagisawa et al. | 720/651 |
| 5,791,636 | A * | 8/1998 | Loziuk | 267/136 |
| 5,897,093 | A * | 4/1999 | Le Derf | 248/628 |
| 6,151,216 | A * | 11/2000 | Vos et al. | 361/704 |
| 6,371,434 | B1 * | 4/2002 | Becker et al. | 248/610 |
| 6,406,011 | B1 * | 6/2002 | Kosar et al. | 248/570 |
| 6,530,563 | B1 * | 3/2003 | Miller et al. | 267/136 |

FOREIGN PATENT DOCUMENTS

| | | |
|---|---|---|
| EP | 0 764794 | 3/1997 |
| EP | 0 813203 | 12/1997 |
| EP | 1 122458 | 8/2001 |
| FR | 1560072 | 2/1969 |
| FR | 1569208 | 5/1969 |
| GB | 2222657 | 3/1990 |
| NL | 9101012 | 6/1991 |

* cited by examiner

VIBRATION DAMPER FOR DAMPENING VIBRATIONS AT LOW FREQUENCIES

This application claims the benefit of Danish Application No. PA 2001 01197 filed Aug. 8, 2001 and PCT/DK02/00527 filed Aug. 8, 2002.

BACKGROUND OF THE INVENTION

The present invention concerns a vibration damper for supporting vibration sensitive items, particularly electromechanical items as e.g. hard disks, floppy disk drives, CD-ROM drives and the like in relation to a base, including springs in the form of fixed bent wire pieces, each built up of a number of twisted strands, where each bent wire piece is approximately in one plane.

It is known to dampen vibrations, e.g. by rotating machines there is often inserted a damper between the machine itself and the floor surface or the base on which the machine is mounted in order to prevent that vibrations are propagated to the surroundings. There are many examples of this type of vibration dampening which dampen the vibrations satisfactorily. Dampening of vibrations arising as a result of the operation of a machine, e.g. by rotating rollers, reciprocating pistons or the like, the vibrations being in a frequency range where the dampening compared with the very large mass of the machine in itself is relatively simple, as numerous different materials and embodiments may be used. For this kind of vibration dampening is used specially reinforced rubber pads, strong springs and the like.

In the case of vibrations, including particularly transmission of vibrations from one item to another, where one item is very light at the same time as the vibrations are its a frequency range from 0–200 Hz, particularly from 0–100 Hz, there are a number of problems which have not been solved in a satisfactory way. In that the item to be isolated from vibrations is very light, traditional springs and rubber systems cannot be used, as these, due to the dead weight of the vibration sensitive item, either causes the spring to appear too stiff or result in too great an amplitude in the dampening process. Furthermore, rubber and plastic systems have the drawbacks that the spring characteristic changes as a function of the temperature, i.e. when it is very cold, the rubber becomes very hard, whereby the damper provides very little dampening at low frequencies. At the same time, rubber may decompose as a result of sunshine, oil, grease etc. whereby the service life for a rubber damper is limited. Traditional helical springs are often too rigid and have limited lifetime, as the material will suffer fatigue failure after using it a short time. A typical car spring should be chanced after about 200,000 km as there is increased probability of material failure above this limit.

From document EP 764 794 is known a vibration damper which is constructed with a base plate connected via four wire pieces to a top plate. By mounting the base plate on a base or a frame and the top plate to the element to be isolated from vibrations, according to the invention it should be possible to isolate the transmission of vibrations from the construction to the vibration sensitive item in three planes arranged perpendicularly to each other.

A corresponding system is indicated in patent publication NL 9101012, where curved wire pieces are connected from a base plate to a top plate. The intention is that the base plate is to be mounted on a frame or a construction, and that the top plate is to be connected to the vibration sensitive item, whereby the curved wire pieces are to isolate the vibration sensitive item from vibrations created in the frame or the base.

Common to these systems is that the curved wire pieces are mounted in one plane perpendicularly to the vibrator, i.e. the base.

In the following, the dampening elements will be described with reference to an X-Y-Z co-ordinate system, where the XY, XZ and YZ planes form three mutually perpendicular planes.

If a damper as illustrated in EP 764 794 is placed in a three-dimensional co-ordinate system so that the base plate is disposed in the XZ plane and the springs are placed in a plane perpendicularly to the XZ plane, e.g. in the YZ plane, the damper will function in that movements in the Y direction are absorbed by bending of the curved wire pieces, movements in the Z plane will be absorbed as rolling, and actions in the X direction will be absorbed by torsion in the curved wire pieces. An arbitrary vibration pattern will therefore be a combination of the above mentioned pattern of movement, whereby the curved wire pieces will interact with their respective spring constants for performing the desired dampening. Physically it is so that the spring constant, which is determining how a spring will react to an action, is different depending on whether the curved wire pieces are actuated by compression, rolling or torsion. Thee damper according to EP 764 794 and other comparable systems will therefore dampen differently, depending on the direction of the resultant of the vibrations that the damper is installed to isolate from. Where the item desired to be isolated from vibration influence is fixed, i.e. not movable, it may be possible to compensate for this difference in degree of dampening, as the resultant of the action has constant direction by different provisions.

The systems known from EP 764 794 and NL 9101012 may generally be denoted vibration dampers with single springs. Laboratory tests show that the so-called single spring systems only have effect at relatively high frequencies, namely around 180 Hz. Up to about 180 Hz, these systems amplifies the vibrations transmitted from the base to the vibration sensitive item. For frequencies above 180 Hz, the damper is activated and starts to reduce the influence of vibrations transmitted to the vibration sensitive item.

Electronic equipment finds still wider application and becomes a more and more integrated part of daily life. To a still greater extent, different kinds of electronics are fitted in vehicles, such as boats, ships, trains, buses, lorries, normal cars, etc., and the electronic items are therefore exposed to jolts and other non-uniform actions. Particularly with regard to jolts, electronic items or apparatuses in which there are also mechanical components are particularly exposed. This is particularly the case with CD players, CD-ROM players, hard disks and similar apparatuses, which besides very sensitive electronics also consist of very sensitive mechanics. In order that these installations may also operate optimally, it is desirable to dampen the vibration transmission from the vehicle/ship/train/bus/car itself and to the electromechanical component.

Particularly concerning installation of electronic equipment, as e.g. hard disks, CD-ROM drives, or other sensitive equipment in ships, trains, buses, vehicles, airplanes and other locations, where vibrations below 180 Hz are generated, i.e. at relatively low frequencies, the prior art single spring systems are thus unsuitable as they have a negative effect on the total vibration transmission to vibration sensitive items.

There is therefore a need for providing a vibration damper suited for isolating light vibration sensitive elements from a vibration generating base at relatively low frequencies.

SUMMARY OF THE INVENTION

It is therefore the purpose of the present invention to provide a vibration damper which is structurally simple and independent of temperature, which dampens the vibrations uniformly in three mutually perpendicular planes and which may dampen the transmission of vibrations from base to items with low dead weight at relatively low frequencies.

According to the present invention, this purpose is achieved with a vibration damper of the above mentioned type, which is peculiar in that the vibration damper consists of two springs arranged in two mutually perpendicular planes, respectively, of which one plane is parallel to the base, where a first spring is fastened to the base and a second spring is fastened to the vibration sensitive item, and that the two springs are interconnected.

With a structure according to the invention it is achieved that the spring characteristic, i.e. the spring constant in all three planes, is largely the same. This is achieved by loads and actions of the damper preferably being absorbed in the form of torsion or by rolling in the curved wire pieces.

Considering a curved/bent wire piece in an XYZ co-ordinate system, loaded with the force P, where radius of the wire piece is R, the following theoretical relations between the force P, the moments M and the torque T are obtained.

Curved Bent Spring

| Load | $M_R$ | $M_y$ | T |
|---|---|---|---|
| $P_y$ | $P_y \cdot R\sin\theta$ | 0 | $P_y R(1 - \cos\theta)$ |
| $l_y$ | $R\sin\theta$ | 0 | $R(0 - \cos\theta)$ |
| $P_x$ | 0 | $P_x R(1 - \cos\theta)$ | 0 |
| $l_x$ | 0 | $R(1 - \cos\theta)$ | 0 |
| $P_z$ | 0 | $P_z R\sin\theta$ | 0 |
| $l_z$ | 0 | $R\sin\theta$ | 0 |

By inserting the expressions found above for the moments in the three planes in the work equation, the following relation for the deflection u is found.

Only contribution from one force direction is considered at a time.

$$u_{BX} = \int \frac{M_R M_{RI}}{EJ} ds + \int \frac{M_y M_{yI}}{EJ} ds + \int \frac{T T_1}{GJ_1} ds$$

$$u_{BX} = \int_o^\pi \frac{M_R M_{RI}}{EJ} Rd\theta + \int_o^\pi \frac{M_y M_{yI}}{EJ} Rd\theta + \int_o^\pi \frac{T R_1}{GJ_1} Rd\theta$$

$$u_{BX} = \frac{R}{EJ} \int_o^\pi P_x R(1 - \cos\theta)(R(1 - \cos\theta))d\theta \Leftrightarrow$$

$$u_{BX} = \frac{P_x R^3}{EJ} \cdot \frac{3\pi}{2}$$

$$u_{BX} = \frac{R}{EJ} \int_o^\pi (P_y \cdot R\sin\theta)(R\sin\theta)d\theta + \frac{R}{EJ} \int_o^\pi (0)(0)d\theta$$

$$\frac{R}{GJ_1} \int_o^\pi P_y R(1 - \cos\theta)(R(1 - \cos\theta))d\theta \Leftrightarrow$$

$$u_{BX} = \frac{P_y R^3}{EJ} \cdot \frac{\pi}{2} \left(1 + 3\frac{EJ}{GJ_1}\right)$$

Curved Spring Subjected to Bending Action:

$$u_{B2} = \frac{R}{EJ} \int_o^\pi (P_z \cdot R\sin\theta)(R\sin\theta)d\theta$$

$$u_{BZ} = \frac{P_2 \cdot R^3}{EJ} \cdot \frac{\pi}{2}$$

Spring force defined as $$F = -K_1 \cdot x$$

where
$K_1$ is the spring stiffness
x is deflection
$E = 2.1 \cdot 10^5$ N/mm$^2$
$G = 0.8 \cdot 10^5$ N/mm$^2$
$I_p = I_r = 21$
The spring stiffness of a curved spring is hence $$\frac{P_x}{u_x} = \frac{2EJ}{R^3} \cdot \frac{1}{3\pi} \Rightarrow K_x = K \cdot \frac{1}{3}$$

$$\frac{P_z}{u_z} = \frac{2EJ}{R^3} \cdot \frac{1}{\pi} \Rightarrow K_z = K$$

$$\frac{P_y}{u_y} = \frac{2EJ}{R^3} \cdot \frac{1}{\pi} \cdot \frac{1}{\left(1 + 3 \cdot \frac{EJ}{GJ_1}\right)} = \frac{2EJ}{R^3} \cdot \frac{1}{\pi} \cdot \frac{1}{\left(1 + 3 \cdot \frac{2,1 \cdot 1}{0,8 \cdot 2}\right)} \Leftrightarrow$$

$$\frac{P_y}{u_y} = \frac{2EJ}{R^3} \cdot \frac{1}{\Pi} \cdot \frac{1}{4,938} \rightarrow K_y = K \cdot \frac{1}{4,938}$$

From the mathematical elaboration above, it thus appears that the spring constant is K when a curved wire piece is subjected to a compression force; where the curved wire piece is subjected to rolling, the spring force is $$\frac{1}{3} K,$$

and where a curved wire piece becomes curved in a plane perpendicular to the plane of the curved spring, i.e. where the wire piece is subjected to torsion, the spring force is approximately $$\frac{1}{5} K.$$

By considering again the prior art systems with a single spring, where it is preferably the spring force K which is used for dampening the vibrations, as the dampening occurs by composing the curved wire piece, an explanation of the lack of effect of the systems at frequencies below 180 Hz may be explained by a substantially greater action of force of the sprig is to be present before a spring with the spring constant K becomes affected compared with a spring with a spring constant of $$\frac{1}{5} K.$$

Since the force basically has been defined as mass x acceleration (F=m·a), considering here small masses, it is thus the acceleration, i.e. the amplitude of the vibrations transmitted from the vibrating item to the vibration sensitive item, which is to have a certain magnitude in order for mass x acceleration to reach a size for the spring to appear in its active range.

According to the invention, two springs are arranged in plane perpendicularly to each other, of which one plane is parallel with the base. Hereby is achieved that where forces occur due to vibrations in a direction where a spring is to be compressed and thus has the spring constant K, these forces are absorbed as torsion $$\left(\frac{1}{5}K\right)$$

or by rolling $$\left(\frac{1}{3}K\right)$$

in the spring arranged perpendicularly thereto, as the system will absorb loads/influences in the softest section. Besides being softer than a corresponding single spring system, the system is also more uniform as a spring with a spring constant of 1 K is never to be activated, but a spring with a spring constant of $$\frac{1}{3}K$$

at most is activated. The difference between the required force in the three planes thus becomes the difference between $$\frac{1}{3}K$$

and almost $$\frac{1}{5}K,$$

whereas the difference in the single-spring systems are from a spring constant in one plane of 1 K to a spring constant in another plane of $$\frac{1}{5}K.$$

The vibration damper according to the invention thus has a substantially more uniform spring characteristic in all three planes than the prior art systems.

Wires consist of a number of strands that are intertwined into a finished wire. Besides, each single strand may consist of a number of single threads that in turn may be twined or twisted together into a fine strand.

By rolling, but particularly by torsional action of a curved wire piece spring, the force is absorbed by friction between the individual twisted strands. This is an essential factor for the extremely long service life of this type of spring system. By experiments with a spring system according to the invention in a preferred embodiment as described below and as illustrated in FIGS. 3–7, the experiment was terminated after a test cycle corresponding to more than 10 years of use, without the system having changed spring characteristics or having shown signs of material failure.

In a preferred embodiment, the strands are made of acid proof stainless steel, but also other materials may be used for making the curved pieces of wire, including galvanised steel, zinced steel, pure steel, copper, tungsten, titanium, modified plastic, glass fibre, carbon fibre, fibre reinforced resin materials, or different combinations of suitable materials. When selecting material, besides the resulting spring characteristic, the durability of the materials when subjected to bending and friction is also to be taken into consideration as the different materials have different bending and moment characteristics.

In a further, preferred embodiment, the two mutually perpendicularly arranged springs are connected in a fixed connecting point. By fixing the connecting point, e.g. by fastening two fishplates about the curved wire pieces, it is achieved that the forces resulting from the vibrations are transmitted as pure resultants to the activated spring. By this is meant that in the transition zone from one spring in one plane to another spring in a plane perpendicular thereto, partial rolling of the spring before the force is absorbed as torsion does not occur, but that the fixed connection between the two springs ensures that there are pure actions, i.e. either only torsion or only rolling in the spring.

In a further preferred embodiment, the damper includes eight springs, where the springs are arranged in pairs in one plane and approximately perpendicularly to each other, and that the four spring pairs are arranged for supporting a vibration sensitive item in relation to a base. Furthermore, the spring pairs may be arranged in such a way that the curved wire pieces are lying in an approximately straight plane, which is arranged in parallel with the plane of the base.

This system is very favourable as there is achieved a very uniform spring characteristic for the entire system. Where a difference in the spring constant from $$\frac{1}{3}K$$

to about $$\frac{1}{5}K$$

is attained in a system with two curved wire pieces arranged mutually perpendicularly, with a system as described above is achieved a system with spring constants from about $$\frac{1}{5}K \text{ to } \frac{1}{6}K\text{-}$$

thus a very homogenous vibration damper.

In order to add further stability to the vibration damper, the four spring pairs may be mutually connected in one plane by means of a reinforcing element, which is fastened in the assembly points, where the two curved wire pieces that constitute a spring pair, are connected. By arranging a stiff reinforcing element in the connection point of the spring is achieved that the influence from the vibrations becomes evenly distributed among the individual curved wire pieces. Hereby, the spring characteristic of each individual curved wire piece is better utilised, why the structure may be made overall smaller and thereby more space-saving.

In a preferred embodiment, the bent wire pieces form approximately a semi-circle, or alternatively a full circle, as well as it is also possible to arrange two semi-circular wire pieces to the fastening at the base, the vibration sensitive element or the stiff connecting point arranged between the two springs, respectively, in such a way that two semi-circular, curved wire pieces will form a fall circle. In the embodiment where plural spring pairs are arranged side by side, the springs may be formed by curved wire being shaped as a figure eight or in a spring version with an arbitrary number of windings so that a piece of wire forms more curves and thereby more springs. In order to achieve optimal dampening it is, however, important that each curve piece, where it is in contact with the base, another curve piece, or the vibration sensitive item, respectively, is rigidly connected, as the actions due to the vibrations may thereby be transmitted to the curved wire piece as rolling or torsion, respectively, as described above.

For dampening different items with different dead weight as well as by different frequencies, it may be necessary to change the characteristics of the damper. This can be done by varying the choice of material for the strands, the dimension of the strands, the number of threads in each strand, the kind of surface treatment applied to the strands, and the length and degree of twisting of the strands. By degree of twisting is understood the firmness with which the individual threads in the strand have been twisted about each other. Besides, the wire dimension and the number of strands together with the degree of twisting may be parameters that may be varied for adapting the individual curved wire pieces to the dampening task for which the damper is to be used.

Where the curved wire pieces are exposed to torsion as described above, the force action from the vibrations is absorbed in the curved wire pieces as friction between the individual strands. When choosing material, particular consideration is to be taken to the frictional properties of the material. Furthermore, it has appeared advantageous to coat the individual strands with a function-reducing material. Particularly Teflon has appeared to be a favourable coating material. Besides providing a very long service life for each curved wire piece, the curved wire piece is also given a more uniform internal friction, resulting in a very uniform spring constant over time.

As mentioned in the introduction, dampening systems are to have a certain minimum load before the springs forming part of the dampening system come into their active dampening range. By dampening vibrations at relatively low frequencies, i.e. below 200 Hz, and where the item to be isolated from vibration is a very light item, as e.g. a hard disk, the vibration dampener may advantageously be pre-loaded. This means that the system is made with a dead weight in addition to the dead weight of the disk or the CD-ROM drive, so that it is ensured that the curved wire pieces constituting the springs in the system are brought into their active range.

The invention will now be explained in more detail with reference to the attached drawings and diagrams, where:

DETAILED DESCRIPTION OF THE PREFERRED EMBODIMENTS

Figure 1:
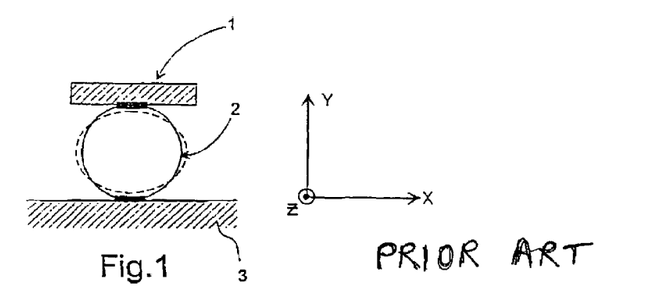
FIG. 1 illustrates schematically a vibration damper of prior art.
Figure 3A:
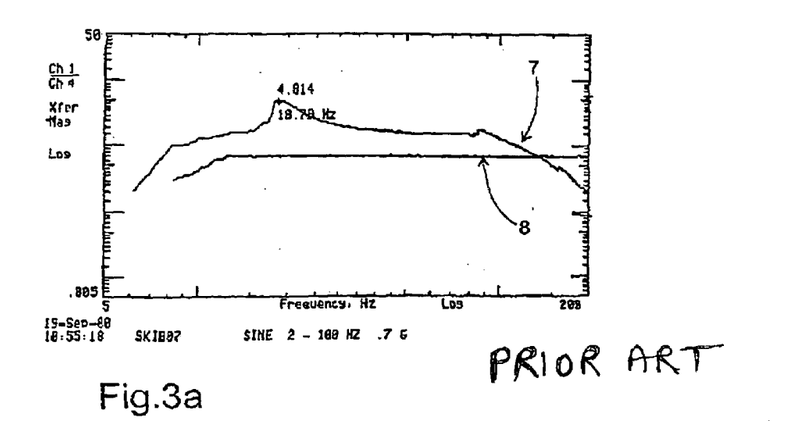
FIG. 3a shows a dampening curve of a single spring system.
Figure 3B:
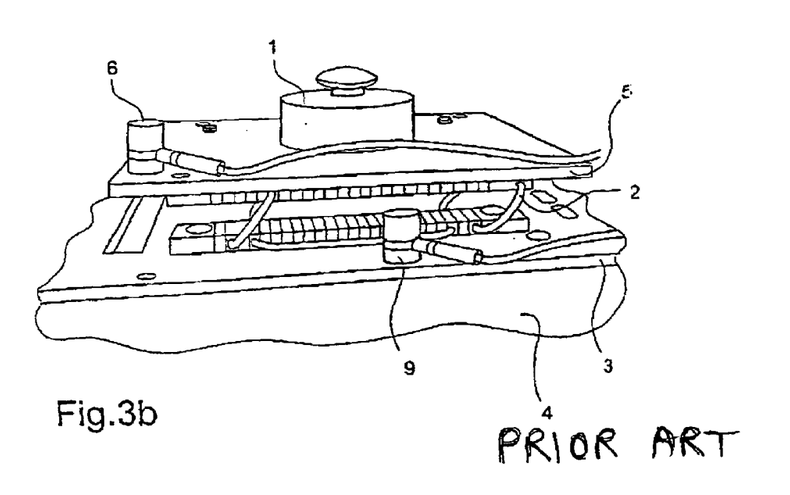
FIG. 3b shows a single spring system.

The principle in a known single spring system is illustrated in FIG. 1 corresponding to the test set-ups, where the dampening curve is indicated in FIG. 3a, and the test set-up associated therewith is illustrated in FIG. 3b.

The vibration sensitive item 1 is mounted so that the curved wire pieces 2, in his case two pieces, are disposed between the vibration sensitive item 1 and the base 3. It is pre-supposed that vibrations are supplied to the system via the base 3 which is dampened in the spring system 2, so that the vibration sensitive item 1 is not exposed to significant vibrations.

By actions in X direction, rolling of the spring will occur. By action in Z direction, out of or into the plane of the paper according to the schematic drawing, the action of force with be absorbed in the springs via bending and thereby torsion of the wire. Torsion is absorbed by friction between individual strands of which the wire is made up.

By vibrating actions with a force resultant in Y direction, the vibration force will be absorbed in the curve wire piece as compression of the wire piece.

Above, it is derived mathematically that the spring constant and thereby the ability of the spring to dampen vibrations in different directions, varies according to how the spring is influenced. Thus it has been found that by action in X direction, the spring constant was about $$\frac{1}{3}K,$$

by action in Z direction where the forces are absorbed as torsion, the spring force was about $$\frac{1}{5}K,$$

and by actions in Y direction there was a full spring constant. This implies that the vibration damper as illustrated in FIG. 1 will not have the same dampening characteristic in all three planes, but the characteristic will vary in relation to the relative spring constants. A test set-up as illustrated in FIG. 3 was used for examining the dampening characteristic of a single spring system. The test set-up is constructed by a base plate 3 being permanently mounted on a vibratory table 4. The vibration sensitive item 1 is provided in the test set-up in the shape of a weight corresponding to the weight of a typical hard disk, namely about 100 g. A thin metal sheet 5 has been bonded to the vibration sensitive element. Between the base plate 3 and the thin sheet 5 there is arranged a curved wire sprig 2. Furthermore the vibrating table 4 has been fitted with a vibration sensor in the form of an accelerometer (not shown) as well as the top sheet 5 has been fitted with an accelerometer 6. By vibrating the vibrating table at different frequencies, measurements were performed on the vibrations of the vibrating table 4 and of the thin sheet 5 via the meter 6. The resulting curves are illustrated in FIG. 3a.

Both X and Y axes are presented as logarithmic axes. The X-axis indicates the frequency with which the vibrating table was oscillated, and the Y-axis indicate the resulting amplitude measured on the thin sheet in the sensor 6. The curve 7 indicates the amplitude measured on the thin sheet 5, i.e. the oscillations that are transmitted to the vibration sensitive item 7. The lowermost curve 8 illustrates the amplitude of the vibrations applied to the vibrating table to be transmitted via the vibration damper to the vibration sensitive item 1. As it appears from the Figure, the vibrations in the vibrating table, illustrated by the curve 8, result in that larger amplitudes and thereby more violent oscillations are transmitted to the vibration sensitive item than if the item had been mounted directly on the vibrating table. Only at frequencies above about 180 Hz, dampening in the springs occur, whereby the amplitude in the vibration sensitive item and thereby the vibratory load to which it is exposed becomes less than the vibrators load applied in the vibrating table.

Figure 2:
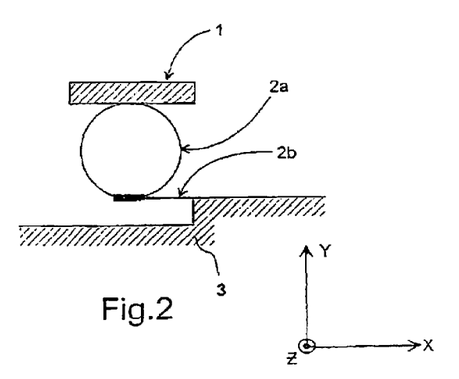
FIG. 2 shows in principle a dampening system according to the invention.

FIG. 2 illustrates the principle in a vibration damper according to the invention. The vibration sensitive item 1 is connected to a base 3 via two springs 2a and 2b in the form of curved wire piece. The springs 2a and 2b are identical but mounted in mutually perpendicular planes, so that the spring 2b is mounted in a plane in parallel with the plane of the base. The individual curved wire pieces will form an approximately single plane. When the vibration damper is influenced with loads in the X direction, the load will be absorbed as rolling in the spring 2a as compression of the spring 2a will not occur. This is due to, as described above, that the spring constant at the compressing of a spring of this type is 1K, whereas the spring constant by rolling is only $$\frac{1}{3}K.$$

Therefore, the system will absorb actions in X direction with the smallest spring force, i.e. with rolling in spring 2a. By action in Y direction, spring 2b will absorb the load as bending and thereby by torsion, the force being absorbed as internal friction between the strands in the wire. In the same way as with actions in X direction, this is due to the fact that the spring constant by torsion is about $$\frac{1}{5}K,$$

where it is 1K when compressing spring 2a. In the same way, forces in Z direction will be absorbed as bending and thereby torsion in spring 2a. As it appears from the schematic drawing, there will be a considerably more uniform dampening of vibrations in three dimensions in a set-up according to the invention compared with prior art.

Figure 4A:
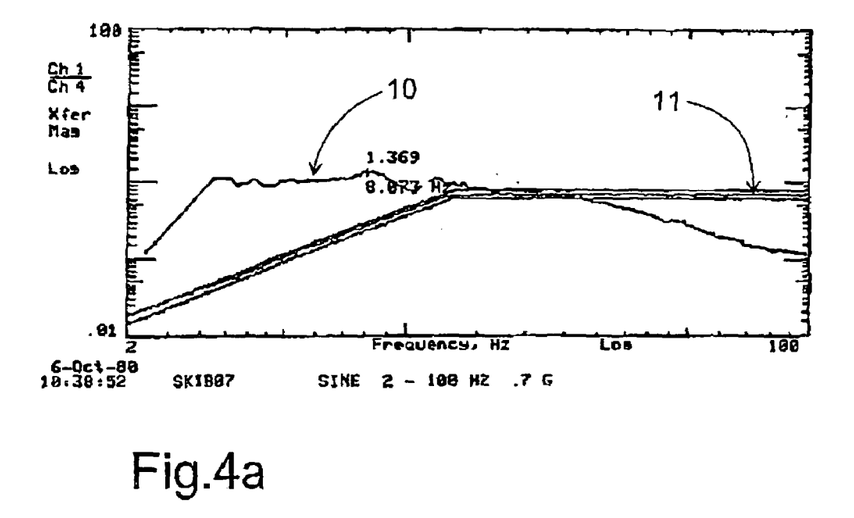
FIG. 4a illustrates a dampening curve for a double spring system according to the invention.

In FIG. 4a is illustrated the dampening process of a set-up as illustrated in 4b, corresponding to the invention, as the curve 10 shows the amplitude measured on the vibration sensitive object, in this case a hard disk as shown by 1 and where curve 11 shows the amplitude of the base in the shape of the vibrating table 3. From the curve appears that the vibration sensitive item is subjected to vibrations at the most corresponding to an insignificant part over what the vibrating table supplies to the system. Already at about 55–60 Hz, the system begins actively to dampen the vibrations transmitted from the base to the vibration sensitive item 1. In the test set-up illustrated in FIG. 4b, the vibration sensitive item is a hard disk 1 on which is fitted an accelerometer 6 for detecting the vibrations transmitted to the vibration sensitive item 1. The vibrating table 3 induces vibrations which are detected by a not shown meter, which propagate through the springs 2a and 2b to the vibration sensitive items. Due to the arrangement of the spring, an active dampening is effected even about 60 Hz.

Figure 4B:
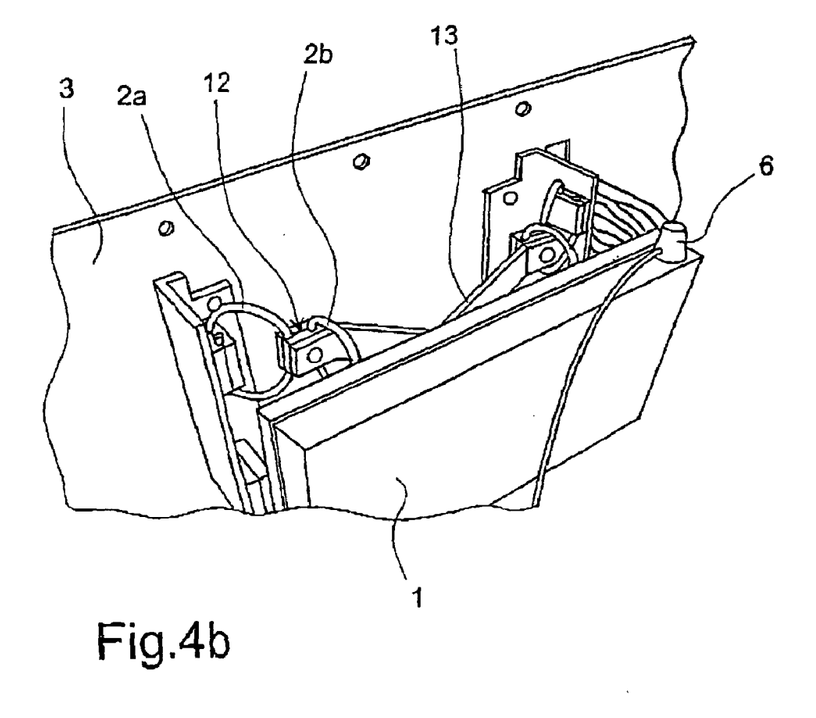
FIG. 4b illustrates a double spring system.
Figure 5A:
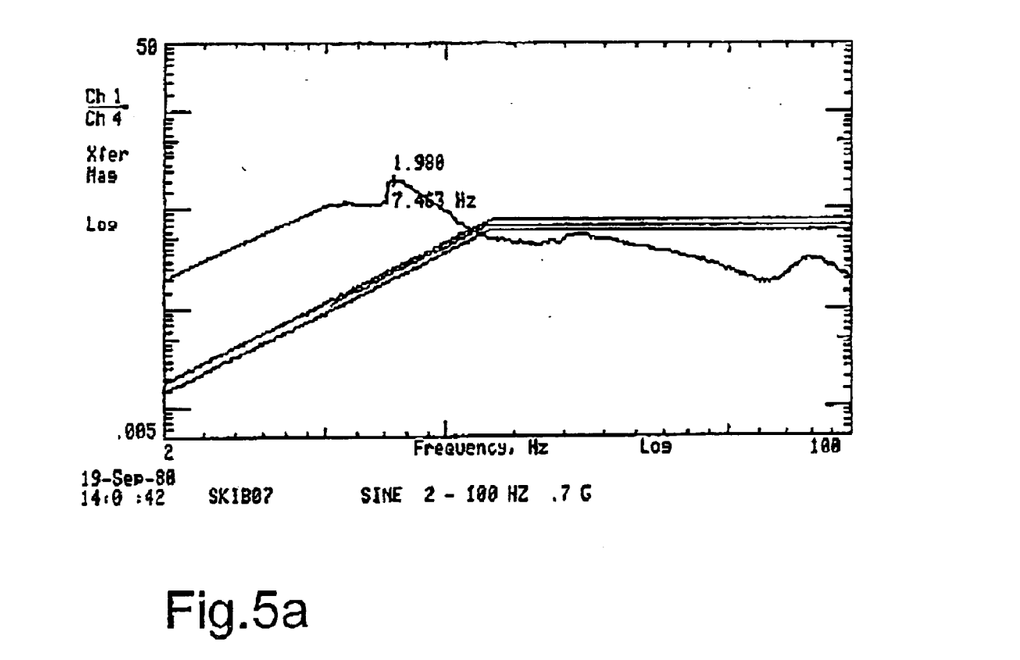
FIG. 5a illustrates the dampening curve for a double spring system according to the invention.
Figure 5B:
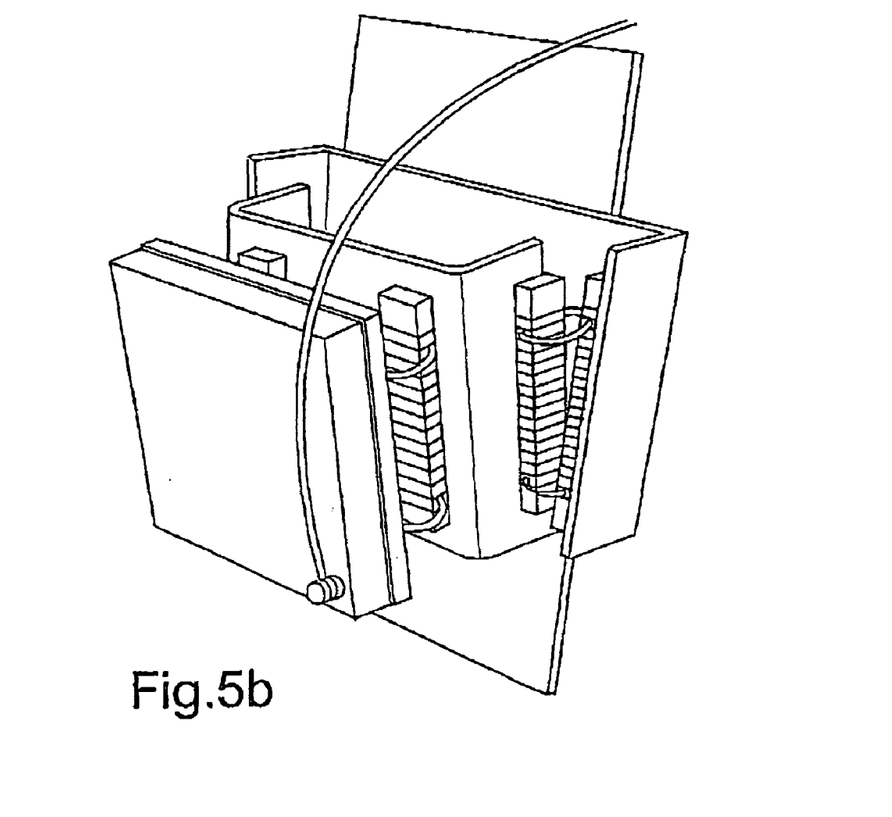
FIG. 5b illustrates an alternative double spring system, FIG. 6a also illustrates a dampening curve for a double spring system according to the, invention.
Figure 6A:
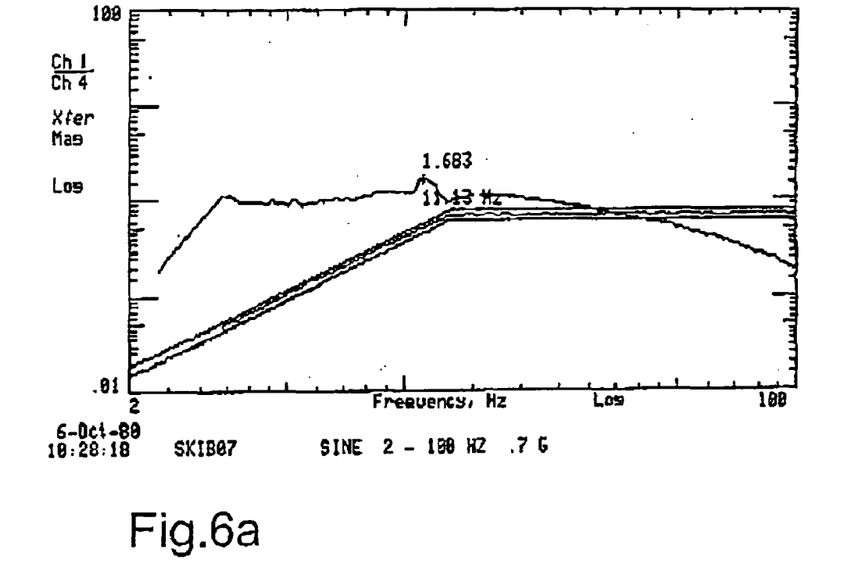
Figure 6B:
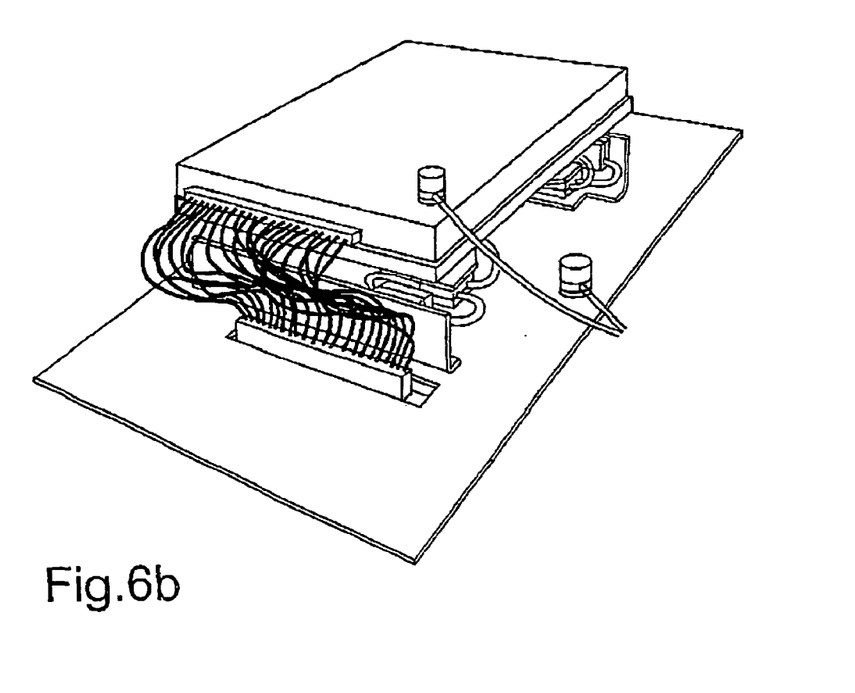
FIG. 6b illustrates a double spring dampening system with hard disk fitted.
Figure 7A:
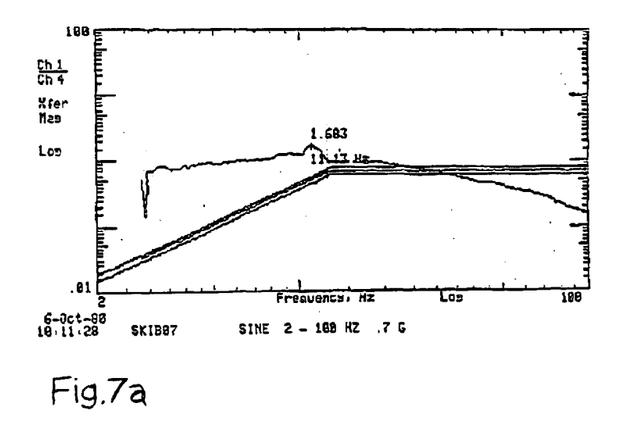
FIG. 7a illustrates a dampening curve for a double spring system according to the invention.
Figure 7B:
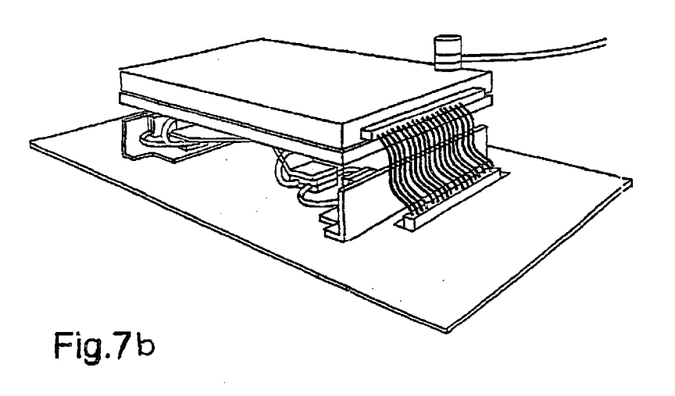
FIG. 7b illustrates a double spring dampening system.

Besides the two curved wire pieces 2a and 2b arranged in mutually perpendicular planes, the vibration damper has farther three correspondingly curve wire pieces arranged in pairs. Each pair of curved wire pieces are connected with each other via a fixed connecting element 12. Each of the four curved wire pieces arranged in pairs are connected via a reinforcing element 13, which is fastened to the in pairs curved wire pieces in their fixed connecting point 12.

The fixed connecting points 12 serve to retain the curved wire pieces in planes that are approximately perpendicular to each other. By fixing the curved wire pieces in relation to each other it is achieved that the vibration actions are absorbed in the springs as pure resultants, i.e. either by rolling or torsion. Hereby is ensured that the system really attains the theoretical degree of dampening to which it is designed.

The reinforcing element 13 serves to distribute uniformily the actions from the vibrations from the base to the springs in the vibration damper. When the vibration damper is fitted on a vibratory base e.g. in a train, in a bus, in a car or aboard a ship or an airplane, it is not probable that the vibrations will be transmitted quite uniformly to all spring forming part of the vibration damper. By thus installing a reinforcing plate 13, these differences are equalised to a certain degree so that individual springs in the system are not loaded substantially more than other springs.

Most electronic items are sensitive to vibrations, particularly electronic items, where a mechanical movement occurs, such as in hard disks or CD-ROM drives. Therefore, this system is particularly suited for dampening vibrations for these light items as the system may dampen vibrations at low frequencies in a uniform way, even for relatively light items such as hard disks and CD-ROM players.

As the dampening system is designed to dampen vibrations at low frequencies for very light electronic items as described above, the dampening system may be influenced unfavourably by external forces. By this is particularly included the wires and cables traditionally to be connected to electronic components which are to be fitted in the spring damper. By the laboratory tests described above, very flexible connecting cables of the type "Superflex" were used, where each cable consists of hundreds of ultra thin strands. Besides being very flexible, the structure of the single cable provides that they have very long service life why no fatigue failure occurs due the few vibrations transmitted to the electronic item. Furthermore, the tests showed that the ultra flexible wires did not have any influence on the dampening characteristics of the vibration sensitive item.

The springs consist of curved wire pieces. Each spring may consist of a wire piece curved to a closed circle and fastened in a connection piece as shown above. Besides, a curved wire piece may form a semi-circle, why it is connected with fixed connection at both end sections of the wire. The fixed connection may be in the shape of two fishplates that are fastened around the curved wire piece, whereby the fishplates are clamped together around the wire in order to secure it. Alternatively, a hole of suitable size may be bored in the assembling plate, after which the end of the wire piece is placed in the hole and a suitable adhesive is supplied for securing the wire piece in the pre-bored hole.

The invention claimed is:

1. A vibration damper for supporting vibration sensitive items in relation to a base, said vibration damper comprising springs in the form of fixed bent wire pieces, each wire piece being built up of a number of twisted strands, where each bent wire piece is contained approximately in a single plane,
   wherein the vibration damper consists of two springs arranged in two mutually perpendicular planes, respectively, of which one plane is parallel to the base, where a first of said two springs is fastened to the base and a second of said two springs is fastened to said first spring and to the vibration sensitive item, said second spring being fastened to said vibration sensitive item at a point that is remote from where it is fastened to said first spring, whereby the two springs are interconnected in said two mutually perpendicular planes, and wherein the bent wire pieces form approximately a semi-circle, or the two bent wire pieces form a full circle and a certain overlap with respect to mounting, or that two bent wire pieces arranged side by side are made continuous,
   wherein each spring absorbs the loads by rolling or torsion in each of the bent wire pieces influenced.

2. A damper according to claim 1, wherein the strands of the bent wire pieces consist of acid proof, stainless steel, galvanised steel, zinced steel, pure steel, copper, tungsten, titanium, modified plastic, glass fibre, carbon fibre, fibre reinforced resin materials, or a combination of two or more of the said materials.

3. A damper according to claim 1, wherein the connection point between two largely mutually perpendicular springs is made as a rigid connection.

4. A damper according to claim 1, wherein eight springs are included, where the springs are arranged in pairs in one plane and approximately perpendicularly to each other.

5. A damper according to claim 4, wherein the bent wire pieces are arranged in two approximately mutually perpendicular planes, of which one plane is in parallel with the base.

6. A damper according to claim 1, wherein the spring constant of the springs may be varied by adjusting one or more of the following parameters: the material and thickness of the strands, number of threads in each strand, surface treatment, length, degree of twisting of the strands, and the dimension of the wire, number of strands and degree of twisting.

7. A damper according to claim 1, wherein the damper is used for dampening less vibration sensitive items, the spring system may be preloaded by applying an extra load on the lesser item, whereby item and plate together attain a minimum well-defined weight.

8. A damper according to claim 1, wherein the wire pieces are fastened in the connecting points at the base or at the vibration sensitive item, respectively, by fastening with fishplates, screws or by bonding or soldering in pre-drilled holes corresponding to the diameter of the wire.

9. The damper of claim 7, wherein the lesser item is mounted on a steel plate with a well-defined weight.

10. The damper of claim 1, wherein the vibration sensitive items are electromechanical items.

11. The damper of claim 10, wherein the electromechanical items are selected from the group consisting of hard disks, floppy disk drives, CD-ROM drives and the like.

12. The damper of claim 1, wherein the two bent wire pieces arranged side by side are made continuous in the shape of a figure eight.

* * * * *